(12) United States Patent
Ellison et al.

(10) Patent No.: US 8,290,112 B2
(45) Date of Patent: Oct. 16, 2012

(54) MULTI-STAGE JET PUMP MIXER ASSEMBLY

(75) Inventors: Phillip Glen Ellison, Wilmington, NC (US); John R. Bass, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 12/838,723

(22) Filed: Jul. 19, 2010

(65) Prior Publication Data
US 2012/0014495 A1    Jan. 19, 2012

(51) Int. Cl.
   *G21C 19/28* (2006.01)
   *B05B 3/06* (2006.01)
   *F04F 5/48* (2006.01)
   *F04F 5/36* (2006.01)

(52) U.S. Cl. ......... 376/372; 239/251; 417/157; 417/195

(58) Field of Classification Search .................. 376/372; 239/251; 417/157, 195
See application file for complete search history.

(56) References Cited

U.S. PATENT DOCUMENTS

| | | | | |
|---|---|---|---|---|
| 3,369,735 A * | 2/1968 | Hoffmeister | .................. | 417/174 |
| 3,468,397 A * | 9/1969 | Vegeby | .......................... | 181/252 |
| 3,838,002 A * | 9/1974 | Gluntz et al. | ................. | 376/407 |
| 3,938,738 A * | 2/1976 | Nagel et al. | ........................ | 239/9 |
| 4,285,770 A * | 8/1981 | Chi et al. | ....................... | 376/407 |
| 6,817,837 B2 * | 11/2004 | Hutchinson et al. | ............ | 417/77 |

FOREIGN PATENT DOCUMENTS
RU    1556208 A2 * 10/1996
* cited by examiner

*Primary Examiner* — Erin M Leach
(74) *Attorney, Agent, or Firm* — Harness, Dickey & Pierce, P.L.C.

(57) ABSTRACT

A boiling water nuclear reactor (BWR) multi-stage jet pump mixer assembly according to a non-limiting embodiment of the present invention may include at least one nozzle disposed above a first throat structure which is arranged within a second throat structure. The multi-stage jet pump mixer assembly is configured such that when a drive flow is discharged from the nozzle into the first throat structure, a first suction stage occurs in that a first entrained flow is drawn into the first entrainment entrance and forms a mixed flow. The mixed flow exiting the first throat structure then induces a second entrained flow into the second entrainment entrance during a second suction stage. By employing a multi-stage approach, jet pump efficiency may be improved.

15 Claims, 4 Drawing Sheets

US 8,290,112 B2

MULTI-STAGE JET PUMP MIXER ASSEMBLY

BACKGROUND

1. Field

The present disclosure relates to jet pumps for nuclear reactors.

2. Description of Related Art

FIG. 1 is a cutaway view of a conventional jet pump in a reactor pressure vessel of a boiling water reactor (BWR). Such a conventional jet pump only has one suction stage. Referring to FIG. 1, a drive flow 102 of a motive fluid (coolant outside the reactor pressure vessel) enters the riser pipe 104 and flows upwardly to the inlet elbows 106. As the drive flow 102 is discharged downwards through the nozzles 108, an entrained flow 110 of suction fluid (coolant inside the reactor pressure vessel) is drawn into the throat 112 of the mixer 114 and is mixed with the drive flow 102. The mixed flow continues downwardly to the diffusers 116 where the kinetic energy of the mixed flow is converted to pressure.

SUMMARY

A boiling water nuclear reactor multi-stage jet pump mixer assembly according to a non-limiting embodiment of the present invention may include an inlet body having a discharge end, wherein the inlet body is configured to receive a drive flow of a motive fluid. The boiling water nuclear reactor multi-stage jet pump mixer assembly may additionally include a first throat structure arranged in proximity to the discharge end of the inlet body so as to provide a first entrainment entrance between the discharge end and the first throat structure, wherein the first throat structure is configured to receive the motive fluid from the inlet body and a first entrained flow of suction fluid external to the inlet body. The boiling water nuclear reactor multi-stage jet pump mixer assembly may also include a second throat structure surrounding the first throat structure so as to provide a second entrainment entrance between the first throat structure and the second throat structure, wherein the second entrainment entrance is configured to receive a second entrained flow of suction fluid external to the inlet body. The boiling water nuclear reactor multi-stage jet pump mixer assembly may further include at least one first stage nozzle disposed on the discharge end of the inlet body and configured to discharge the motive fluid from the inlet body into the first throat structure at a first velocity sufficient to create a first pressure drop that induces the first entrained flow of suction fluid into the first entrainment entrance, wherein the discharged motive fluid and first entrained flow of suction fluid form a first mixed flow that exits the first throat structure at a second velocity sufficient to create a second pressure drop so as to induce the second entrained flow of suction fluid through the second entrainment entrance.

The discharge end of the inlet body may be arranged above a center of the first throat structure. The inlet body may be arranged such that a lowermost surface of the at least one first stage nozzle is below an uppermost surface of the first throat structure. The first throat structure may be arranged concentrically within the second throat structure. The first throat structure may taper in accordance with an inner contour of the second throat structure. Alternatively, the first throat structure may taper less than an inner contour of the second throat structure.

The first and second throat structures may have circular entrance openings, wherein a ratio of a diameter of the entrance opening of the first throat structure to a diameter of the entrance opening of the second throat structure is about 1:1.5. The first throat structure may be spaced apart from the second throat structure by a distance of about 12 to 160 inches. The second throat structure may be regarded as a part of the mixer portion of the jet pump assembly, wherein the mixer may be connected to a diffuser by a slip joint.

The first throat structure may have a length between about 12 to 80 inches. The first throat structure may have an entrance opening and a tapered exit opening, wherein a ratio of the entrance opening to the tapered exit opening is between about 2:1 to 4:1. The tapered exit opening of the first throat structure may be greater than a discharge opening of the at least one first stage nozzle.

The at least one first stage nozzle may include a plurality of first stage nozzles disposed on the discharge end of the inlet body. For instance, up to about 7 first stage nozzles may be disposed on the discharge end of the inlet body. The boiling water nuclear reactor multi-stage jet pump mixer assembly may further include at least one second stage nozzle downstream from the at least one first stage nozzle. In a non-limiting embodiment, a plurality of second stage nozzles may be disposed downstream from the at least one first stage nozzle. For instance, up to about 3 second stage nozzles may be disposed downstream from the at least one first stage nozzle.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
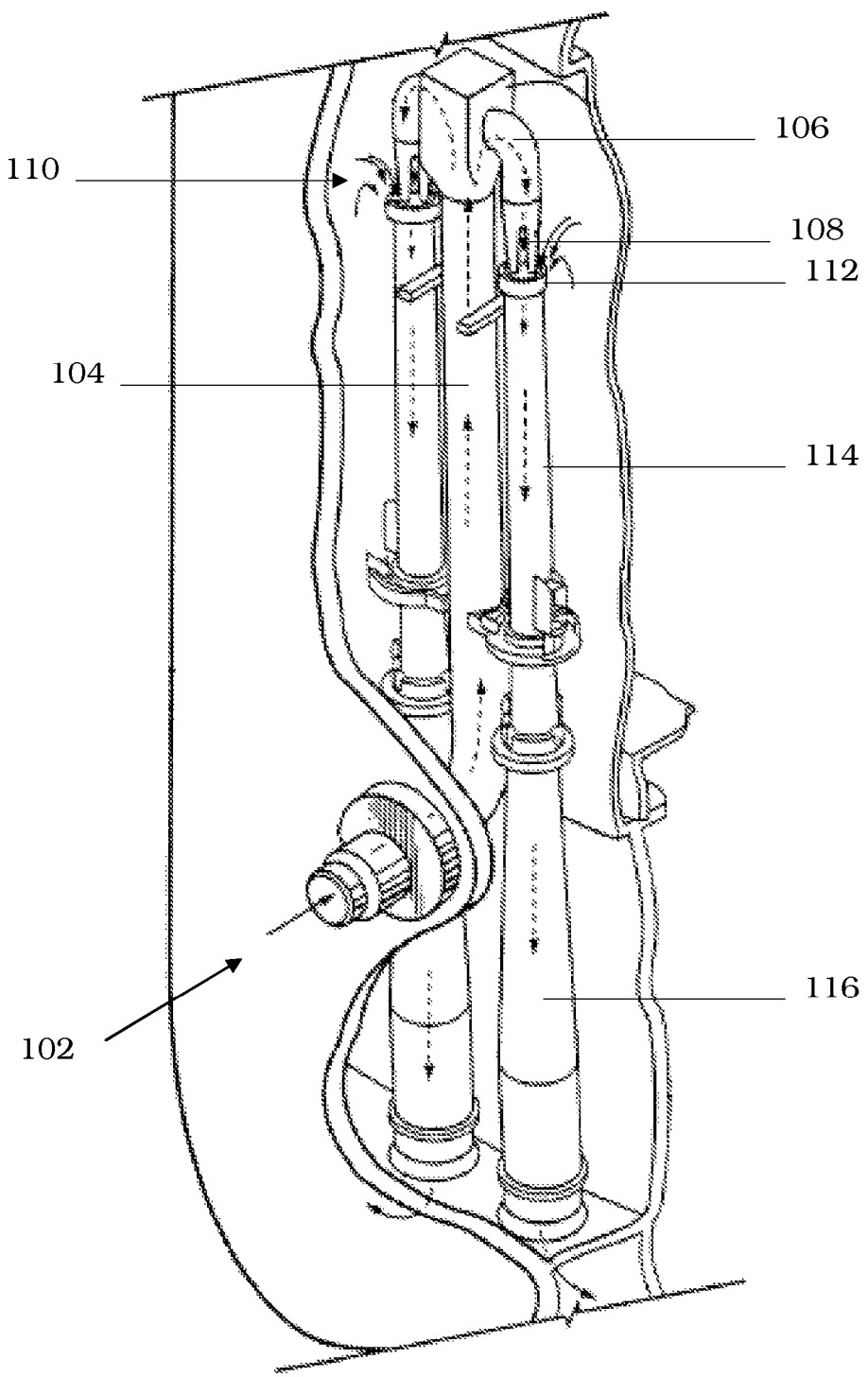
FIG. 1 is a cutaway view of a conventional jet pump in a reactor pressure vessel of a boiling water reactor (BWR).

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2A:
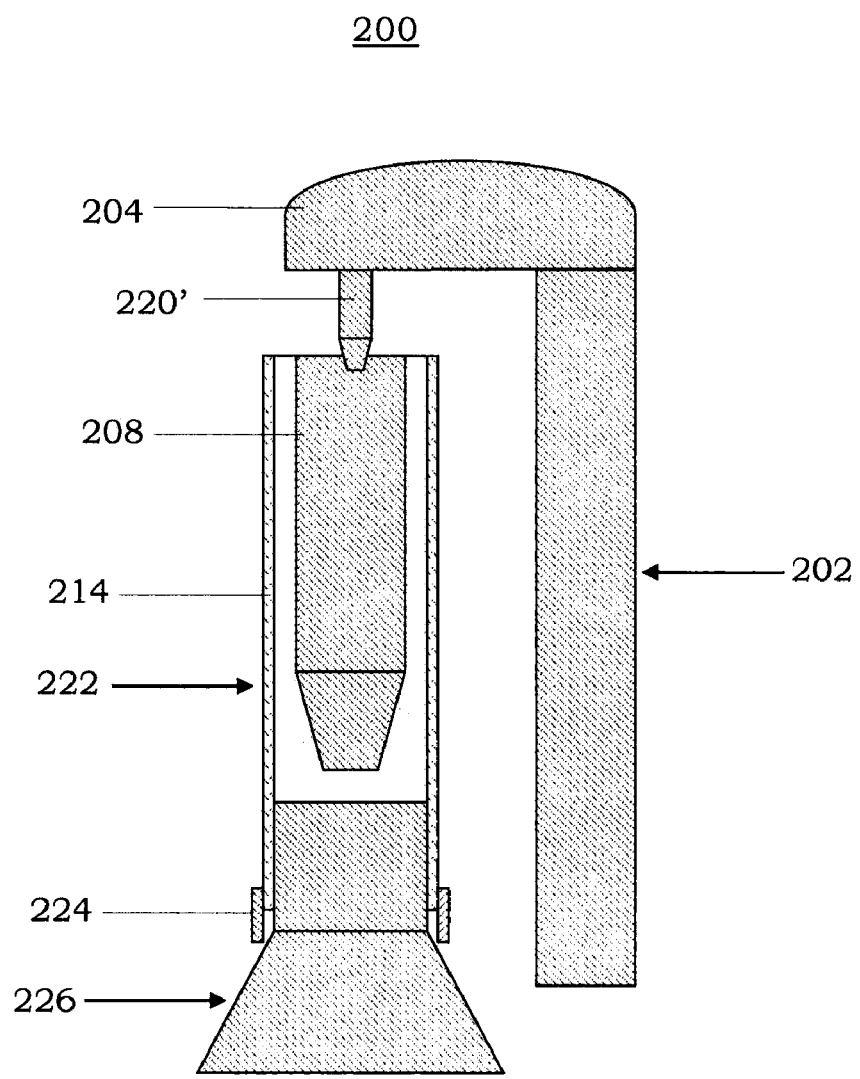
FIGS. 2A-2A' are cross-sectional views of multi-stage jet pump mixer assemblies according to non-limiting embodiments of the present invention.

FIG. 2A is a cross-sectional view of a multi-stage jet pump mixer assembly according to a non-limiting embodiment of the present invention. Referring to FIG. 2A, the multi-stage jet pump mixer assembly 200 generally includes an inlet body 202, a mixer 222, and a diffuser 226. The mixer 222 may be connected to the diffuser 226 by a slip joint 224, although example embodiments are not limited thereto. The mixer 222 includes a first throat structure 208 arranged within a second throat structure 214. The first throat structure 208 may be arranged concentrically within the second throat structure 214, although example embodiments are not limited thereto. For instance, the first throat structure 208 may be spaced apart from the second throat structure 214 by a distance of about 12 to 160 inches.

Although not illustrated, the upper portions of the first and second throat structures 208 and 214 may flare outwards. In such an embodiment, the upper portion of first throat structure 208 may flare outwards in accordance with that of the second throat structure 214. Alternatively, the upper portion of first throat structure 208 may flare outwards to a greater or lesser degree than that of the second throat structure 214.

The first and second throat structures 208 and 214 may have circular entrance openings, wherein a ratio of a diameter of the entrance opening of the first throat structure 208 to a diameter of the entrance opening of the second throat structure 214 is about 1:1.5. The first throat structure 208 may also have a length between about 12 to 80 inches. Furthermore, the lower end of the first throat structure 208 may be tapered. A ratio of the diameter of the upper entrance opening of the first throat structure 208 to that of the lower exit opening may be between about 2:1 to 4:1. However, it should be understood that ratios other than those disclosed above may be utilized without departing from the scope of the present invention.

The inlet body 202 includes a discharge end 204 with a first stage nozzle 220 disposed thereon. The first stage nozzle 220 may be arranged so as to be above a center of the first throat structure 208. For instance, the center line of the first stage nozzle 220 may be aligned with the center line of the first throat structure 208. Additionally, the diameter of the tapered exit opening of the first throat structure 208 is greater than that of the discharge opening of the first stage nozzle 220. Furthermore, as shown in FIG. 2A', the inlet body 202 may be arranged such that a lowermost surface of the first stage nozzle 220 is below an uppermost surface of the first throat structure 208.

Although not illustrated, the multi-stage jet pump mixer assembly 200 may also include a second stage nozzle arranged downstream from the first stage nozzle 220. Alternatively, a plurality of second stage nozzles may be arranged downstream from the first stage nozzle 220. For instance, the multi-stage jet pump mixer assembly 200 may include 1, 2, or 3 second stage nozzles arranged downstream from the first stage nozzle 220, although example embodiments are not limited thereto.

Figure 2B:
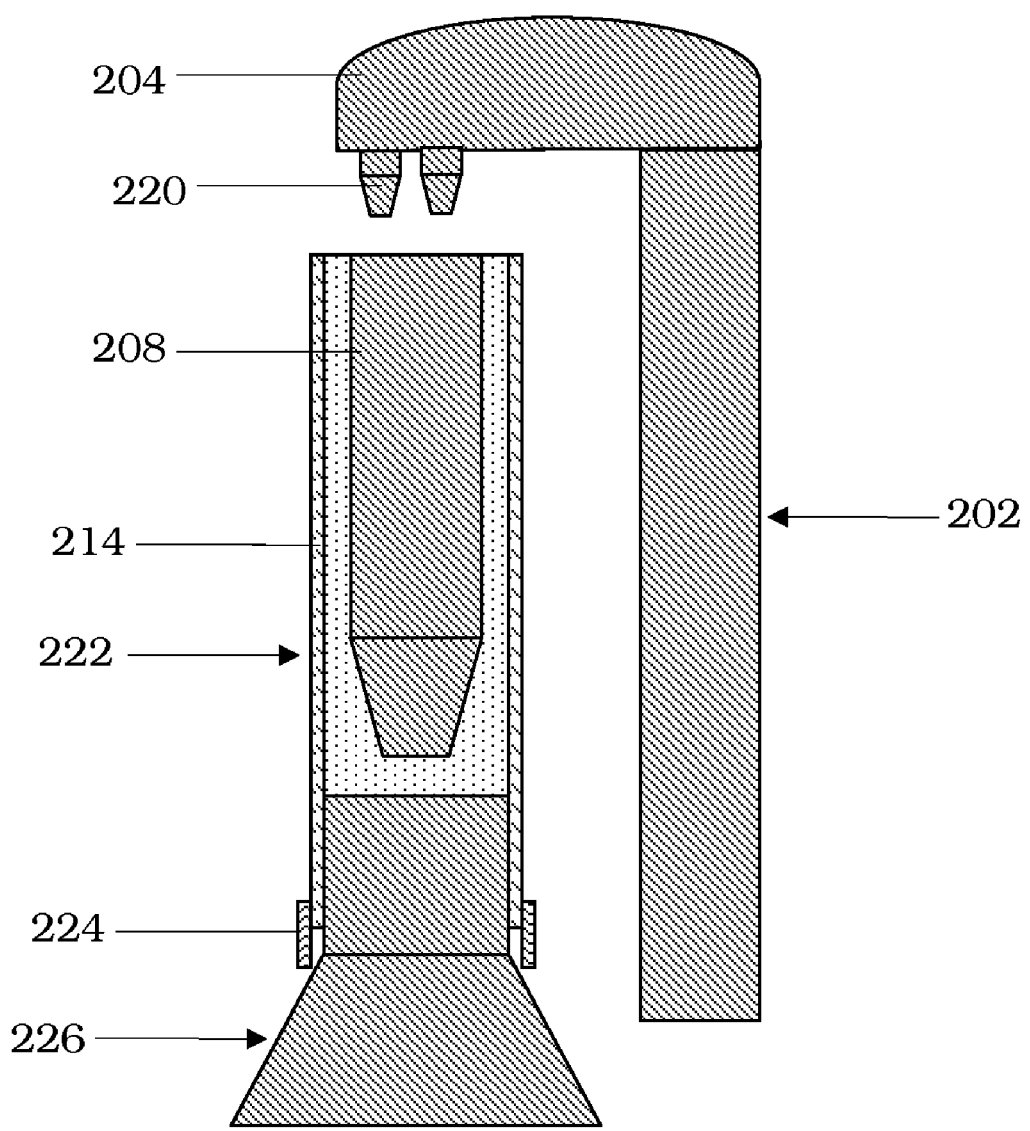
FIG. 2B is a cross-sectional view of a multi-stage jet pump mixer assembly according to another non-limiting embodiment of the present invention.

FIG. 2B is a cross-sectional view of a multi-stage jet pump mixer assembly according to another non-limiting embodiment of the present invention. Referring to FIG. 2B, the multi-stage jet pump mixer assembly 200 may include a plurality of first stage nozzles 220 disposed on the discharge end 204 of the inlet body 202. Otherwise, the multi-stage jet pump mixer assembly 200 of FIG. 2B may be as described in connection with FIG. 2A.

Although only 2 first stage nozzles 220 are shown in FIG. 2B, it should be understood that additional first stage nozzles 220 may be provided. For instance, the multi-stage jet pump mixer assembly 200 may include 1, 2, 3, 4, 5, 6, or 7 first stage nozzles 220 disposed on the discharge end 204 of the inlet body 202. When a plurality of first stage nozzles 220 are utilized, the first stage nozzles 220 may be arranged equidistantly from each other. The first stage nozzles 220 may also be arranged equidistantly from the center line of the first throat structure 208. Furthermore, the plurality of first stage nozzles 220 may be used in combination with the one or more second stage nozzles discussed in connection with FIG. 2A. In such an embodiment, the number of first stage nozzles 220 may exceed the number of second stage nozzles.

Figure 2C:
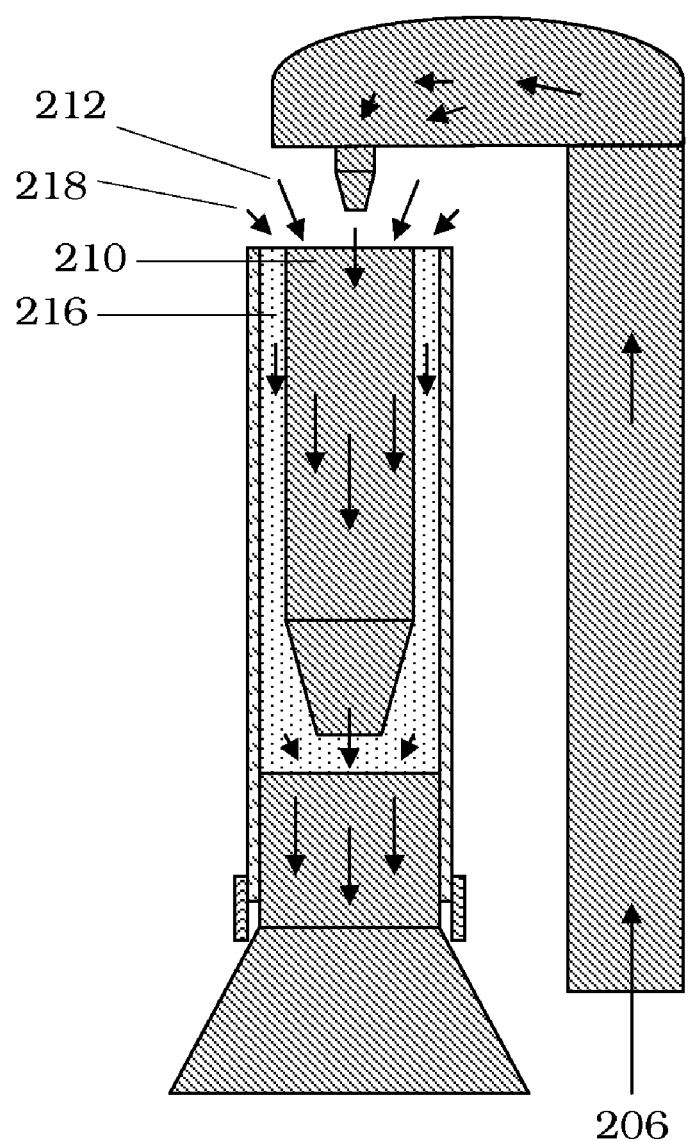
FIG. 2C is a cross-sectional view illustrating the operation of a multi-stage jet pump mixer assembly according to a non-limiting embodiment of the present invention.

FIG. 2C is a cross-sectional view illustrating the operation of a multi-stage jet pump mixer assembly according to a non-limiting embodiment of the present invention. Unlike the conventional art, the multi-stage jet pump mixer assembly 200 includes multiple suction stages. Additionally, although the multi-stage jet pump mixer assembly 200 is as shown in FIG. 2A, it should be understood that the multi-stage jet pump mixer assembly 200 may also be as shown in FIG. 2B.

Referring to FIG. 2C, the multi-stage jet pump mixer assembly 200 is configured such that, during operation, a drive flow 206 of a motive fluid travels through the inlet body 202 at an initial velocity to the discharge end 204 where it is discharged from the first stage nozzle 220. The motive fluid is discharged from the first stage nozzle 220 at a first velocity (which is higher than the initial velocity) into the first throat structure 208. The discharged motive fluid traveling at the higher first velocity is sufficient to create a first pressure drop in the first throat structure 208. As a result, a first entrained flow 212 of suction fluid is drawn into the first entrainment entrance 210 (which is defined by the inner surface of the first throat structure 208) by the discharged motive fluid. This may be regarded as the first suction stage.

The first entrained flow 212 of suction fluid and the discharged motive fluid mix in the first throat structure 208 to form a first mixed flow. The first mixed flow exits the first throat structure 208 at a second velocity that is sufficient to create a second pressure drop in the second throat structure 214. As a result, a second entrained flow 218 of suction fluid is drawn into the second entrainment entrance 216 (which is defined by the outer surface of the first throat structure 208 and the inner surface of the second throat structure 214) by the first mixed flow. This may be regarded as the second suction stage.

The second entrained flow 218 in combination with the first mixed flow exiting the first throat structure 208 forms a total combined flow that travels to the diffuser 226 where the kinetic energy of the total combined flow is converted to pressure. The pressure, in turn, provides the requisite core circulation of the boiling water reactor. Although the example above pertains to a non-limiting embodiment that utilizes two suction stages, it should be understood that additional suction stages (e.g., three suction stages) may be employed without departing from the scope of the present invention. In sum, by employing a multi-stage approach, jet pump efficiency may be improved. Accordingly, it should also be understood that the present invention also encompasses a method of improving jet pump efficiency by employing multiple suction stages, wherein a first drive flow is used in the first stage to induce a first entrained flow, and the combination of the first drive flow and the first entrained flow is then used in the second stage to induce a second entrained flow.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A boiling water nuclear reactor multi-stage jet pump mixer assembly comprising:
   an inlet body having a discharge end, the inlet body configured to receive a drive flow of a motive fluid;
   a first throat structure arranged in proximity to the discharge end of the inlet body so as to provide a first entrainment entrance between the discharge end and the first throat structure, the first throat structure configured to receive the motive fluid from the inlet body and a first entrained flow of suction fluid external to the inlet body, the first throat structure having a body with a first end and an opposing second end, the first end being proximal to the discharge end of the inlet body, the first throat structure having an entrance opening at the first end and a tapered exit opening at the second end, the exit opening being smaller than the entrance opening;
   a second throat structure surrounding the first throat structure so as to provide a second entrainment entrance between the first throat structure and the second throat structure, the second entrainment entrance configured to receive a second entrained flow of suction fluid external to the inlet body; the entire first throat structure positioned within the second throat structure; and at least one first stage nozzle disposed on the discharge end of the inlet body and configured to discharge the motive fluid from the inlet body into the first throat structure at a first velocity sufficient to create a first pressure drop that induces the first entrained flow of suction fluid into the first entrainment entrance, the discharged motive fluid and first entrained flow of suction fluid forming a first mixed flow exiting the first throat structure at a second velocity sufficient to create a second pressure drop that induces the second entrained flow of suction fluid through the second entrainment entrance.

2. The boiling water nuclear reactor multi-stage jet pump mixer assembly of claim 1, wherein the discharge end of the inlet body is arranged above a center of the first throat structure.

3. The boiling water nuclear reactor multi-stage jet pump mixer assembly of claim 1, wherein the first throat structure is arranged concentrically within the second throat structure.

4. The boiling water nuclear reactor multi-stage jet pump mixer assembly of claim 1, wherein the first throat structure tapers in accordance with an inner contour of the second throat structure.

5. The boiling water nuclear reactor multi-stage jet pump mixer assembly of claim 1, wherein the first and second throat structures have circular entrance openings, a ratio of a diameter of the entrance opening of the first throat structure to a diameter of the entrance opening of the second throat structure is about 1:1.5.

6. The boiling water nuclear reactor multi-stage jet pump mixer assembly of claim 1, wherein the first throat structure has a length between about 12 to 80 inches.

7. The boiling water nuclear reactor multi-stage jet pump mixer assembly of claim 1, wherein a ratio of the entrance opening to the tapered exit opening is between about 2:1 to 4:1.

8. The boiling water nuclear reactor multi-stage jet pump mixer assembly of claim 1, wherein the first throat structure is spaced apart from the second throat structure by a distance of about 12 to 160 inches.

9. The boiling water nuclear reactor multi-stage jet pump mixer assembly of claim 1, wherein the tapered exit opening of the first throat structure is greater than a discharge opening of the at least one first stage nozzle.

10. The boiling water nuclear reactor multi-stage jet pump mixer assembly of claim 1, wherein the inlet body is arranged such that a lower most surface of the at least one first stage nozzle is below an uppermost surface of the first throat structure.

11. The boiling water nuclear reactor multi-stage jet pump mixer assembly of claim 1, wherein the at least one first stage nozzle includes a plurality of first stage nozzles disposed on the discharge end of the inlet body.

12. The boiling water nuclear reactor multi-stage jet pump mixer assembly of claim 1, wherein the second throat structure is connected to a diffuser by a slip joint.

13. The boiling water nuclear reactor multi-stage jet pump mixer assembly of claim 1, wherein the body of the first throat structure does not flare outwards from the first end to the second end.

14. The boiling water nuclear reactor multi-stage jet pump mixer assembly of claim 1, wherein the body of the first throat structure defines a fluid passage therein, and the fluid passage does not expand from the first end to the second end of the body of the first throat structure.

15. The boiling water nuclear reactor multi-stage jet pump mixer assembly of claim 1, wherein the body of the first throat structure has sidewalls, and the sidewalls are not perforated.

* * * * *